United States Patent Office 2,867,198
Patented Jan. 6, 1959

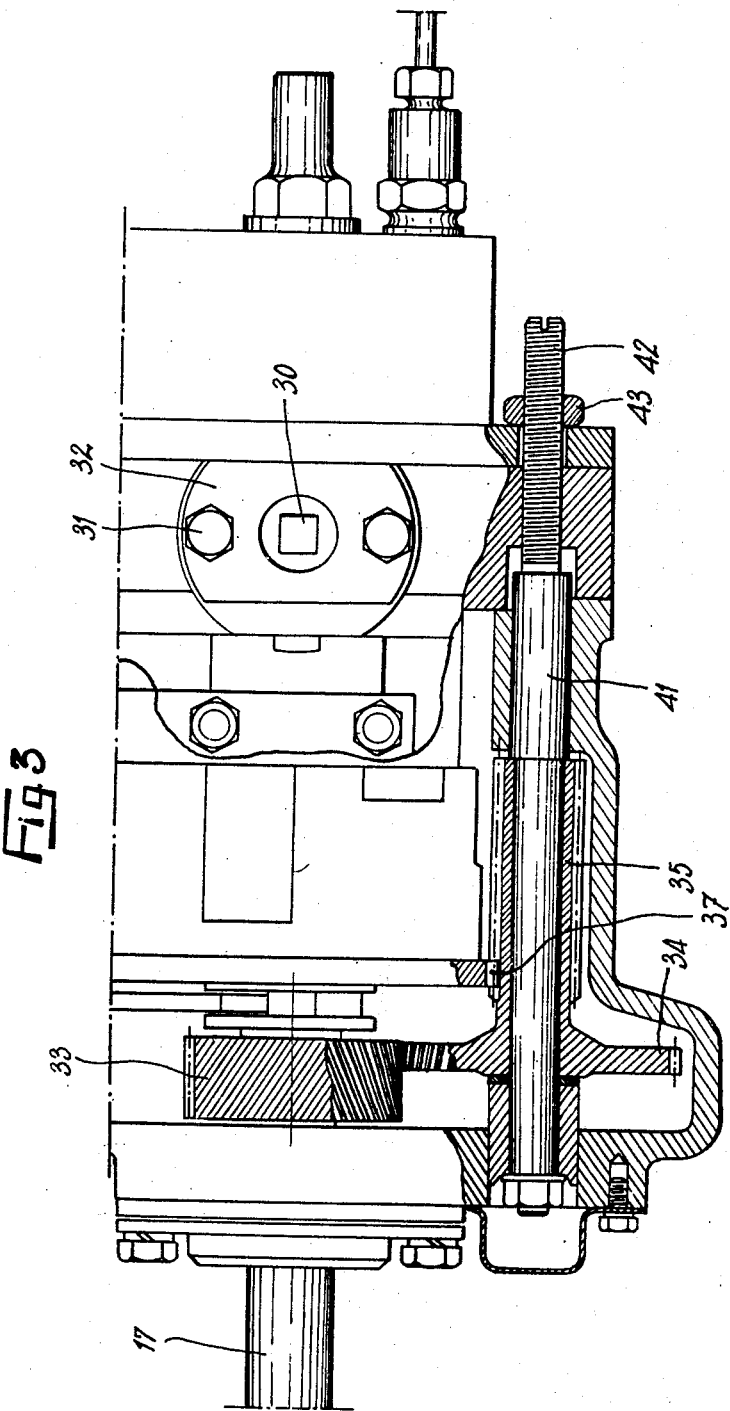

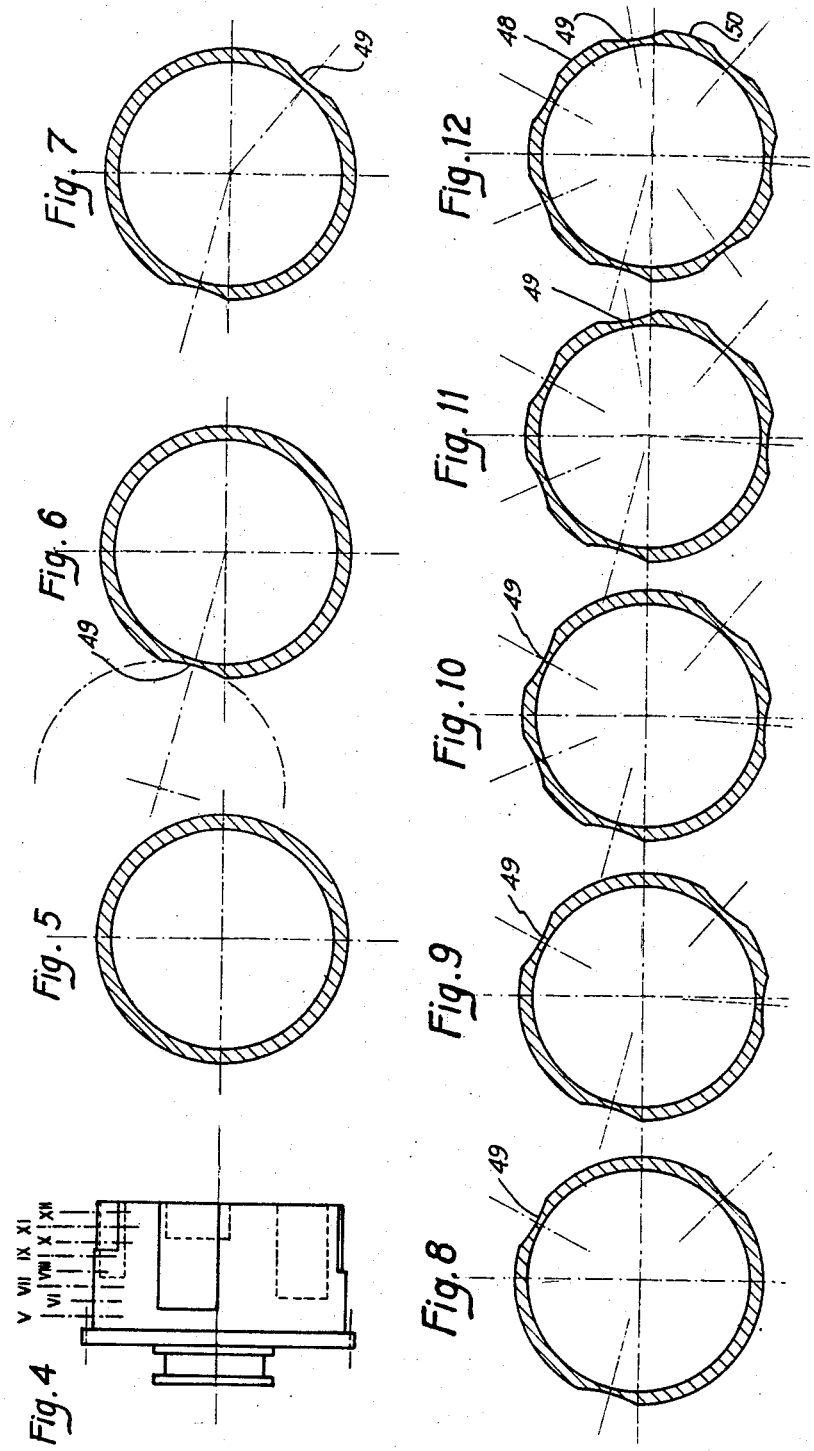

2,867,198
METHODS OF REGULATING POWER OUTPUT IN INTERNAL COMBUSTION ENGINES

Lucien Péras, Billancourt, France, assignor to Regie Nationale des Usines Renault, Billancourt, France Application June 30, 1955, Serial No. 519,149

Claims priority, application France December 23, 1954

5 Claims. (Cl. 123—139)

It is the object of the invention to provide a constructive embodiment of an apparatus permitting the carrying out of the improvement in the method of regulating power output in internal combustion engines forming the subject of the patent application Ser. No. 388,999 of October 29, 1953, of the applicant, now Patent 2,771,867, issued November 27, 1956.

The latter relates to a four-stroke or two-stroke internal combustion engine (or controlled ignition engine), having one or more cylinders, in which the vaporization is produced by fuel injection, whereby said injection may be effected in the combustion chamber or in the admission pipe, and the object of the improvement to the foregoing mentioned application is to adapt the power-output to the various loads which are applied not by continuous means such as the progressive opening of a valve or the progressive variation of the richness, but by this discontinuous means which cause full combustion cycles and totally inert cycles to alternate in time in a variable proportion. The possible variations in power output are no longer represented by a continuous curve but to some extent by a "staircase" in which the number of stairs is predetermined and selected at will. This number corresponds to a period of operation of the engine which comprises this same number of cycles and it represents the denominator of the power-output fraction in question; the numerator being the number of injections effectively carried out within this period under consideration.

In order to cut out or permit the injection in the course of one cycle, provision is made in the foregoing mentioned application for the opening or closing of a by-pass valve situated downstream of the injection pump. This valve, being very lightly loaded, tends to lift for the injection, when it is not held by an electric pneumatic or mechanical member subject to the control of a synchronised distributor. This distributor determines the power-output fraction selected and there are as many distributor units capable of coming into action as there are possible power-output fractions.

In the process described in the foregoing mentioned application, no assumption is made regarding the type of injection pump selected provided it is a volumetric pump. It should be noted that this pump does not require any variation in cubic capacity during the course of operation of the engine because, when injection takes place, the whole amount of fuel corresponding to complete combustion by the maximum amount of air introduced into one cylinder of the engine, is always injected, said amount of air being more or less constant.

The pump may be of the plunger diaphragm, or gear type, etc. The plunger pump given by way of example may be constructed in various ways: the admission may be a port uncovered or not by the pump-plunger, or on the other hand, may be effected by an admission valve, without this process intervening in the manner in which the invention is applied.

Nevertheless, it has long been known that in the case of a pump which comprises an admission valve, it is possible to cut off the injection by keeping said valve artificially lifted.

The object of this invention is to provide a specific embodiment of a plunger pump provided with an admission valve, and using said admission valve instead of the by-pass provided in the embodiment in the foregoing mentioned application. Under all operating conditions, said admission valve should be open during the downward stroke of the plunger.

If it is desired to produce injection, it should be closed during the upward stroke. When injection is not desired, it should remain open during the complete cycle.

The control of the admission valve to obtain partial power-outputs or the total power output is effected during one operating period equal to $n$ cycles, $n$ being the selected denominator of the power-output fraction. The lifting of the said valve is effected by means of a rocker-arm from a distributor cam turning at the speed $$\frac{\omega}{n}$$

if $\omega$ is the speed of the driving shaft of the piston. This cam comprises $n$ sectors. Each sector is divided into two subsectors.

The first sub-sector is synchronised with the descent of the piston and the second sub-sector is synchronised with the return of the piston. The first sub-sectors in each sector always comprise a lobe to effect the opening of the valve during the admission. The second sub-sectors of each sector comprise a recess when it is desired to effect the closing of the valve and hence injection or a lobe when it is desired to cut the injection.

Thus each power-output rating can be obtained with one distributor cam unit and $n$ cams can be brought opposite the rocker arm to obtain each of the $n$ power-output ratings.

This embodiment also comprises a certain number of devices intended not only to simplify the construction of the pump and hence to reduce its price, but also to effect a certain number of useful regulations.

The cylinders and the admission valves are arranged parallel to each other around a circle, a single distributor is provided for all the cylinders.

In the specific embodiment given by way of example, the number of cylinders is six and the number $n$ of power-output fractions is 7.

On the accompanying drawing:

Figure 3 is another partial longitudinal section showing more particularly the initial regulating device for the charge;

Figure 4 is an external view of the single distributor drum;

Figures 5, 6, 7, 8, 9, 10, 11 and 12 are the various sections of the distributor along the lines V, VI, VII, VIII, IX, X, XI, XII in Figure 4, corresponding respectively to the power-outputs 0, $\frac{1}{7}$, $\frac{2}{7}$, $\frac{3}{7}$, $\frac{4}{7}$, $\frac{5}{7}$, $\frac{6}{7}$, $\frac{7}{7}$.

Figure 1:
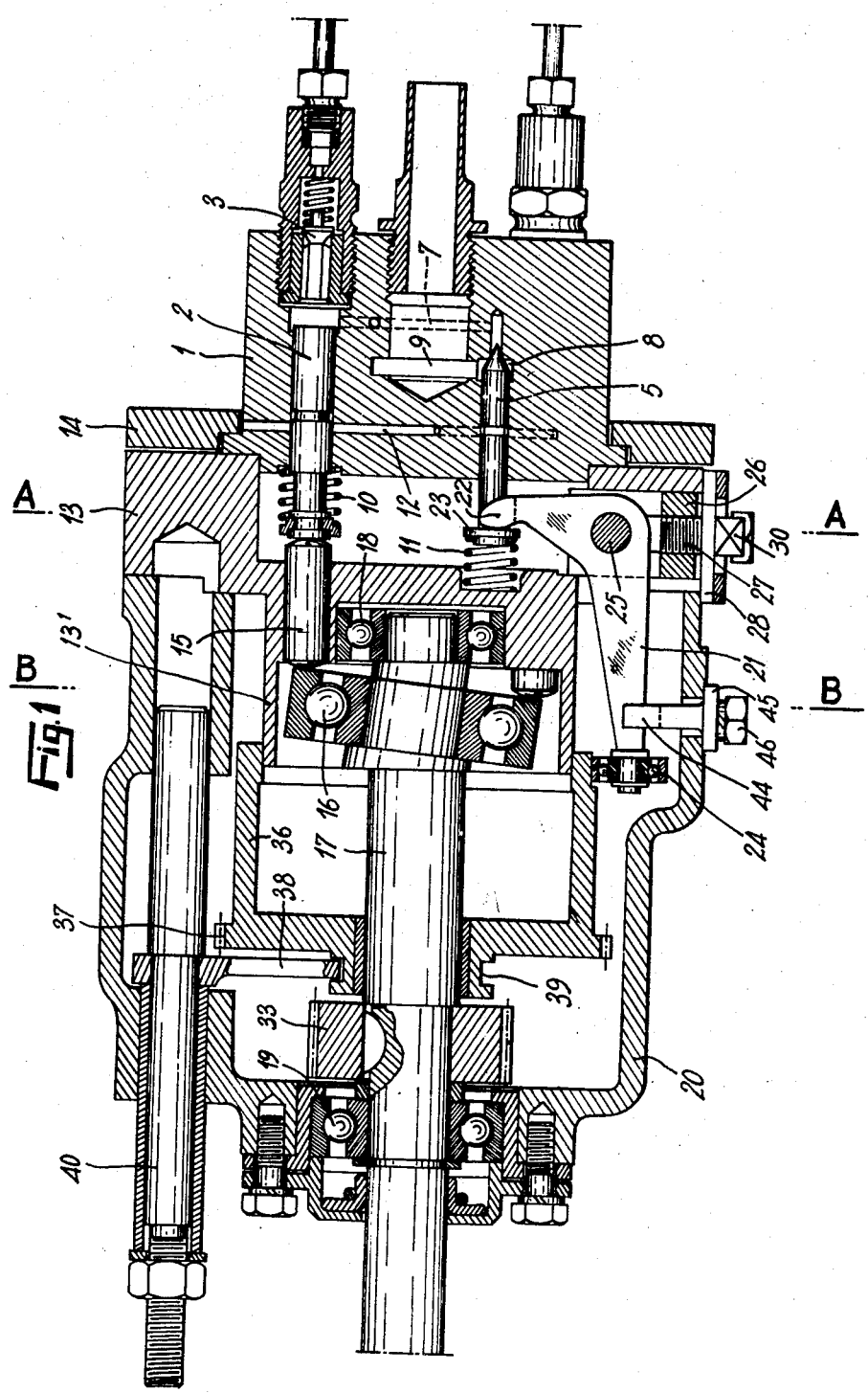
Figure 1 illustrates a longitudinal section of the pump.
Figure 2:
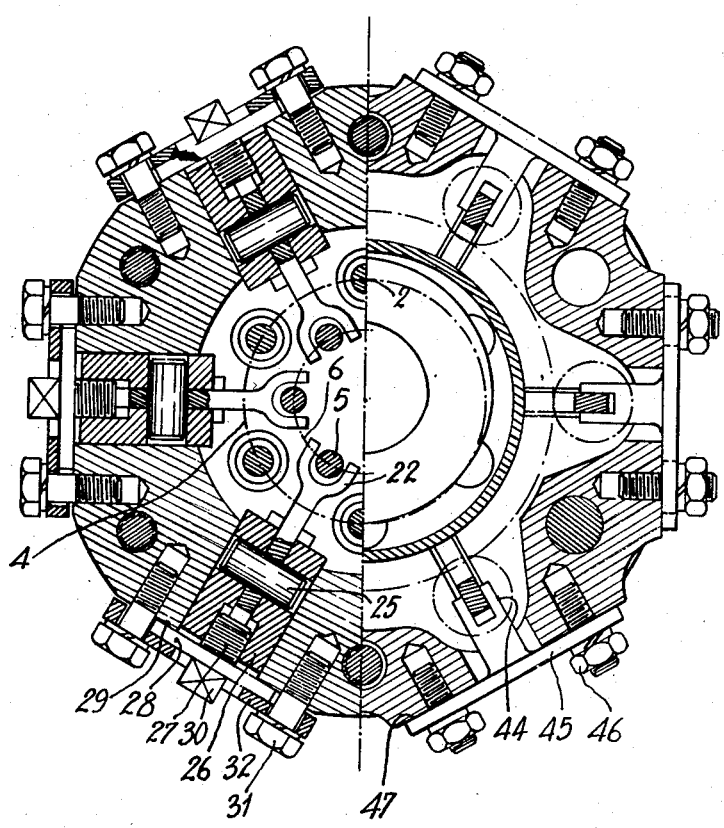
Figure 2 illustrates two half cross-sections, the left-hand portion of Figure 2 being a section along A—A and the right-hand portion being a section along B—B in Figure 1.

The main body 1 of the pump comprises six parallel cylinders which are arranged round a circle with their axes on a circumference 4 and equidistant by 60° and in each of which is displaced a plunger 2. The end of each cylinder is provided with a delivery valve 3 communicating with the injector. The six admission valves 5 have their axes distributed round a circumference 6 of smaller diameter than the circumference 4. They are likewise equidistant by 60° and are interpolated midway between the plunger 2.

These admission valves 5 each communicate with the neighbouring cylinder corresponding thereto through a bore 7 which is made as short as possible so as to avoid pressure losses on admission. The six chambers 8 of the admission valves are connected to a central chamber 9 receiving the fuel under slight pressure. The plungers 2 are continually urged towards the left by return springs 10; the admission valves 5, on the other hand, are continually urged towards the closed position by springs 11.

When the fuel is a liquid which is liable to cause seizing, particularly gasoline, the body 1 has a lubricating duct 12, which can lubricate both the plungers 2 and the valves 5.

The body 1 is fitted to a first support 13 and fixed to said support by an annular locking nut 14. The support 13 contains a series of six push-rods 15, intended to transmit the delivery movement to the plunger 2 in opposition to the return springs 10 which effect the admission stroke. These push-rods 15 are mounted in a circle opposite the plunger 2. The return springs 11 for closing the admission valves 5 also rest against the support 13.

The control of the push-rods 15 is effected by means of a large ball bearing 16 mounted on the interrupted driving shaft 17 which is mounted between a bearing 18 housed in the axis of the support 13, and a bearing 19 housed in the axis of a second support 20, coupled to the support 13. The shaft 17 rotates at the distributor speed of the engine.

The outer ring of the bearing 16 imparts to the push-rods 15 a sinusoidal reciprocating movement, the course of which is determined by the angle of interruption of the shaft 17. It should be noted that the outer ring of the bearing 16 does not normally rotate and that the friction between the bearing 16 and the push-rod 15 is very slight. All that is left is a rolling friction in the balls.

The lifting of the admission valves 5 is controlled by rocker-arms 21, the two levers of which are mounted at right angles, the short lever ending in a fork 22 which embraces the valve 5 and which bears against the collar 23 of said valve. The end of the long lever is provided with a small follower 24 which receives the distributor impulses as will be described below. The rocker-arm pivots about a journal 25, itself mounted in a cylinder 26 which is split to permit the passage of the rocker-arm. It should be noted that the geometric centre of the pivot 25 is arranged in the plane of the collar 23 of the valve 5, in such a manner that the radial displacement of the cylinder 26 in the free space between the body 1 and the support 13, does not involve any angular displacement of the short lever. On the other hand, the same displacement permits the regulation of the play between the follower 24 and the distributer 36. This radial displacement of the cylinder 26 is obtained by means of a screw 27 engaged with the cylinder 26 and provided with a washer 28 which bears against a flat 29 on the member 13. The control of this screw is effected by acting on a square head 30 and, when the regulation has been obtained, the locking of the screw 27 and the sealing of the washer 28 are effected simultaneously by tightening a keep-plate 32 by means of two screws 31.

Keyed to the driving shaft 17 is helical toothed pinion 33 of relatively large width. This pinion 33 meshes with a much narrower wheel 34 (see Figure 3), which forms part of the same sliding gear which also comprises an elongated pinion 35. The pinion 35 drives the distributor 36 through the toothed ring 37 rigidly connected to the distributor. The pinion 35 and the toothed ring 37 have spur teeth strictly parallel to the axis. The distributor 36 rotates freely on the shaft 17 resting against a corresponding bearing surface on the support 13. The two ends of the distributor rest respectively on the shaft 17 and with its open edge on a cylindrical extension 13' of the support 13, thus preventing jamming. The various rollers 24 of the rocker-arms bear against the outer cylindrical surface. The grooves corresponding to the closing of the admission valves, that is to say corresponding to the injections to be effected, are cut directly in the surface of the distributor 36, in parallel planes. In this manner a type of distributor is obtained, corresponding to the distributor of the foregoing mentioned patent consisting of a stack of distributor units.

If Figures 4 to 12 are studied, it will be seen that the grooves consist of milled-out portions 49 which are parallel to the axis of the distributor and the length of which varies so as to produce in the different sections V, VI, VII, VIII, IX, X, XI, XII, in Figure 4, the different distributor units corresponding to the different power outputs. Figures 6 to 12 show the milled-out portions 49 of a distributor unit and on Figure 12 only the bosses 48, 50 bordering one of the milled-out portions 49. The distributor 36 is brought into position longitudinally to effect a given power output by a fork 38, bearing against a groove 39 in the distributor; said fork 38 is mounted on a shaft 40 which can slide in the support 20 parallel to the axis of the apparatus, under the action of a suitable control, the length of the pinion 35 permitting the driving of the distributor to be effected whatever position it may occupy.

As can be seen of Figure 3, the intermediate slide-gear 24, 35, which the pinion 34 is in mesh with the wheel 33, can be displaced axially as far as permitted by the length of the opinion 33, by means of its shaft 41, on which the slide-gear rotates freely without being capable of longitudinal displacement on said shaft. This axial displacement of the slide-gear is obtained by means of a screw 42 in mesh with the support 13 and forming an extension of the shaft 41. This screw 42 can be locked in position by the lock-nut 43. Since the teeth of the pinions 33—34 are helical, the longitudinal displacement of the slide-gear (which may be effected when stopped or during running) involves a relative rotation of the pinions 34—35 and of the pinion 37 in relation to the pinion 33, and hence a displacement of the distributor 36 in relation to the shaft 17 whether stopped or running. As a result it is possible to open the admission valve earlier or later during the delivery stroke, and hence vary the delivery charge. This variation in the delivery charge obtained by displacement of the distributor, is of course effected in the same manner on all the cylinders.

For the initial regulating of the pump, it is worth obtaining equal deliveries for all the cylinders, thus effecting individual regulation of the delivery in each cylinder. In order to do this, it is sufficient to displace slightly, in the direction of movement of the distributor, each of the followers 24 located at the ends of the rocker-arms 21. The operation may be effected simply if it is remembered that the rocker-arm is mounted in a cylinder 26 which can act as a pivot. The end of the long lever of the rocker-arm, just in front of the follower 24, may be held in place or displaced slightly be a clevis 44, rigidly connected to a plate 45 held in place by two screws 46. The plate 45 is mounted on a corresponding flat 47 on the member 20 and effects the oil sealing. The holes for the screws 46, which traverse the plate 45, are made slightly oval in such a manner that the lever can be displaced slightly in the direction of movement of the distributor.

The lubrication of the whole mechanical assembly situated inside the members 13 and 20 is effected by the oil leakages which escape from the plungers and valves lubricated by means of the duct 12. An overflow, not illustrated, is provided to maintain a satisfactory oil level.

The operation of the pump may be deduced from the description: The position of the distributor illustrated on the figures corresponds for full power-output. The pump is driven by the shaft 17 at the speed of the engine camshaft if it is a four-stroke engine and at the crank-shaft speed if it is a two-stroke engine. The bearing 16 imparts to the push-rods 15 a reciprocating movement transmitted to the plungers 2, the springs 10 maintaining the permanent contact between the members 15 and 2. The fuel is fed at the same time, under slight pressure, to the chamber 9 and enters the chambers 8. Simultaneously, the shaft 17 drives the distributor 36 by means of the pinions 33, 34, 35 and 37. When the plunger 2 of a cylinder is effecting its admission stroke, the follower 24 is on the boss 48 of the distributor (Figure 12). The rocker-arm has therefore compressed the spring 11 and lifted the valve 5, the communication between the chamber 8 and the bore 7 is open and consequently the fuel always enters the cylinder chambers under slight pressure.

Towards the end of this stroke, the follower 24 drops into a depression in the distributor 49. The spring 11 restores the position of the valve 5, closing it. During the first part of the delivery stroke, the plunger drives the fuel through the valve 3 towards the injector. At a certain moment in the course, the follower 24 again mounts the following boss 50 on the distributor and opens the valve 5, which abruptly halts the injection, the fuel then being driven not towards the injector by the valve 3, but into the chamber 9. The value of the delivery obtained by each of the pistons is measured; the screws 46 are loosened slightly, permitting the slight displacement of one or the other of the followers 24 until the deliveries are equal. The screws 46 are then tightened again. The nut 53 is loosened and the screw 42 turned. The assembly 34—35 is thus displaced longitudinally in relation to the shaft 17 in such a manner that the moment of opening is changed. In this manner, the delivery of the cylinders is adjusted to the desired value.

When it is desired to pass to a reduced power output, it is merely necessary to displace longitudinally the shaft 40 which displaces the distributor longitudinally and brings opposite the followers 24 the distributor unit corresponding to smaller power-output fractions. The longitudinal movement which tends to increase the power output is obtained positively on a vehicle engine by depressing the accelerator, whereas the movement tending to reduce it is effected by a spring not illustrated.

It is understood that the invention applies to internal combustion engines having any number of cylinders.

I claim:

1. In a solid fuel injection pump for use in a pump-injection fluid system of a multi-cycle internal combustion piston engine, in combination, means comprising individual discharge connections from the pump to the individual cylinders for connecting individual fluid conduits thereto for providing individual fluid paths from the pump to associated individual cylinders of the engine, for each fluid path a normally closed delivery valve automatically operable to an open position when a predetermined fuel discharge pressure is applied to the individual delivery valves upstream thereof and automatically operable to a closed position when the discharge pressure is less than said predetermined pressure, each individual delivery valve being disposed upstream of an associated discharge connection, means including pressure generating means to deliver intermittently a constant volume of fuel under pressure to the delivery valves individually for effecting injections of fuel of constant volume into the cylinders individually, means for variably controlling the fuel injections to the cylinders comprising a plurality of admission valves biased to a closed position, means defining a plurality of individual passageways providing communication between the admission valves individually and the fuel system, means defining individual passageways between the individual admission valves and the pressure generating means, and means including a rotary distributor rotatably driven for operating the admission valves in timed relationship with the pressure generating means, and to operate the valves individually to an open position for providing communication between the fuel system and the pressure generating means and for operating the valves to a closed position for permitting the pressure generating means to deliver fuel under pressure to the delivery valves only during closure of the individual admission valves, the rotary distributor having camming means to maintain a variable number of admission valves in open position during a predetermined number of cycles thereby to interrupt fuel injections to a variable number of cylinders during a predetermined number of cycles to vary the power output of the engine in correspondence to a mathematical fraction representative of the power output of the engine in which the numerator is equal to the total number of fuel injections effected during a predetermined number of cycles which is equal to the denominator of said fraction.

2. In a solid fuel injection pump according to claim 1, in which said means for opening and closing the admission valves includes a plurality of rocker-arms pivotally mounted, each of said rocker-arms having rotatable means at one end bearing on said rotary distributor and actuating an associated admission valve with an opposite end, and driven means for rotating said distributor at a speed equal to the speed of the engine divided by N and where N is the number of cycles.

3. In a solid fuel injection pump according to claim 2, in which the end of the rocker-arms engaging the distributor are displaceable in the direction of rotation of the distributor, and means to move said rocker-arms ends in said direction.

4. In a solid fuel injection pump according to claim 1, in which said rotary distributor comprises a cylinder, said cylinder having a plurality of angularly spaced cam portions arranged longitudinally in consecutive planes on the outer periphery of said cylinder, each of said planes corresponding to a different given power output, said cam portions comprising a plurality of spaced depressions positioned circumferentially around the periphery of the cylinder in each plane and each plane comprising a different number of depressions, and in which said means for opening and closing said admission valves includes pivotally mounted means for actuating said admission valves with said cam portions, and means to selectively displace the cylinder longitudinally, whereby the cam portions in the separate planes are selectively engaged with said pivotally mounted means to selectively obtain a desired power output.

5. In a solid fuel injection pump according to claim 4, in which the engine is provided with throttle control means and in which said means to selectively displace the distributor longitudinally comprises a rigid rod operably connected to the throttle control means and the rotary distributor.

References Cited in the file of this patent

UNITED STATES PATENTS

| | | |
|---|---|---|
| 1,747,578 | Davison et al. | Feb. 18, 1930 |
| 1,907,696 | Woolson | May 9, 1933 |
| 1,967,101 | Rassbach et al. | July 17, 1934 |
| 2,052,549 | Alden | Sept. 1, 1936 |
| 2,300,313 | Pool | Oct. 27, 1942 |